(12) United States Patent
Philiben (10) Patent No.: US 10,175,085 B2
(45) Date of Patent: Jan. 8, 2019

(54) COMPARATIVE FUEL-LEVEL DETECTION SYSTEM

(71) Applicant: CiES, Inc., Bend, OR (US)

(72) Inventor: Scott Philiben, Bend, OR (US)

(73) Assignee: CiES, Inc., Bend, OR (US)

( * ) Notice: Subject to any disclaimer, the term of this patent is extended or adjusted under 35 U.S.C. 154(b) by 106 days.

(21) Appl. No.: 15/342,529

(22) Filed: Nov. 3, 2016

(65) Prior Publication Data

US 2017/0138776 A1     May 18, 2017

Related U.S. Application Data

(60) Provisional application No. 62/254,759, filed on Nov. 13, 2015.

(51) Int. Cl.
| | |
|---|---|
| *G01F 23/26* | (2006.01) |
| *G01F 23/00* | (2006.01) |
| *G01F 23/32* | (2006.01) |
| *G01F 25/00* | (2006.01) |

(52) U.S. Cl.
CPC ........ *G01F 23/0061* (2013.01); *G01F 23/263* (2013.01); *G01F 23/32* (2013.01); *G01F 25/0061* (2013.01)

(58) Field of Classification Search
CPC .... G01F 23/268; G01F 23/263; G01F 23/265; G01F 23/26; G01F 23/261
See application file for complete search history.

(56) References Cited

U.S. PATENT DOCUMENTS

| | | | | |
|---|---|---|---|---|
| 2,500,348 | A | * | 3/1950 | De Giers .............. G01F 23/263 73/296 |
| 2,688,875 | A | | 9/1954 | Boisblanc et al. |
| 2,703,982 | A | * | 3/1955 | Bancroft .............. G01F 23/266 73/304 C |
| 2,724,273 | A | * | 11/1955 | Sontheimer ........... G01F 23/263 361/284 |
| 2,728,035 | A | * | 12/1955 | Frederick .............. G01F 23/263 361/284 |
| 2,737,808 | A | * | 3/1956 | Beecroft .............. G01F 23/263 361/284 |
| 2,760,372 | A | * | 8/1956 | Storm .................. G01F 23/266 73/304 C |
| 2,766,623 | A | * | 10/1956 | De Giers ................ G01F 23/36 361/284 |
| 3,120,124 | A | | 2/1964 | Seliger et al. |

(Continued)

*Primary Examiner* — David A Rogers
(74) *Attorney, Agent, or Firm* — Erise IP, P.A.

(57) ABSTRACT

A fuel-level detection system is configured to determine a fuel level in a fuel system. A comparative fuel probe is associated with the fuel system and includes a capacitive probe assembly configured to provide a comparative capacitive reading, and a float assembly configured to provide a comparative float reading. A comparator is configured to receive the comparative capacitive reading and to receive the comparative float reading, and to determine a corrective factor based at least in part on the comparative capacitive reading and the comparative float reading. A set of capacitive probes is associated with the fuel system. The fuel level in the fuel system is determined by comparing each local capacitive reading from each capacitive probe in the set of capacitive probes with the corrective factor.

18 Claims, 8 Drawing Sheets

(56) References Cited

U.S. PATENT DOCUMENTS

| | | | | |
|---|---|---|---|---|
| 4,099,167 A * | 7/1978 | Pomerantz | ............ | G01F 23/265 |
| | | | | 340/620 |
| 4,212,202 A | 7/1980 | Schmidt | | |
| 4,545,020 A | 10/1985 | Brasfield | | |
| 4,935,727 A * | 6/1990 | Re Fiorentin | ....... | G01F 23/0061 |
| | | | | 340/450 |
| 5,005,407 A * | 4/1991 | Koon | ................... | G01F 23/266 |
| | | | | 340/620 |
| 5,017,909 A * | 5/1991 | Goekler | ............... | G01F 23/265 |
| | | | | 340/620 |
| 5,184,510 A * | 2/1993 | Rossman | ............ | G01F 23/0076 |
| | | | | 73/1.73 |
| 5,765,434 A * | 6/1998 | Harbaugh | ............. | G01F 23/266 |
| | | | | 73/304 C |
| 5,990,807 A | 11/1999 | Cloutier et al. | | |
| 6,459,995 B1 | 10/2002 | Collister | | |
| 6,851,315 B2 * | 2/2005 | Bergsma | ............... | G01F 23/363 |
| | | | | 73/290 R |
| 6,943,566 B2 * | 9/2005 | Florin | .................. | G01F 23/266 |
| | | | | 324/662 |
| 7,258,005 B2 * | 8/2007 | Nyce | ..................... | G01F 23/263 |
| | | | | 73/304 C |
| 7,461,550 B2 * | 12/2008 | Calabrese | ............. | G01F 23/266 |
| | | | | 73/304 R |
| 7,798,586 B2 * | 9/2010 | Watanabe | ............ | B41J 2/17509 |
| | | | | 347/14 |
| 8,047,073 B2 * | 11/2011 | Zabel | .................... | G01F 23/268 |
| | | | | 73/290 B |
| 8,291,761 B2 * | 10/2012 | Burdi | .................. | F04D 15/0218 |
| | | | | 417/211.5 |
| 8,567,244 B2 * | 10/2013 | Farmanyan | ............. | G01F 23/36 |
| | | | | 73/290 R |
| 9,907,908 B2 * | 3/2018 | Chen | .................... | A61M 5/1684 |
| 2004/0079150 A1 * | 4/2004 | Breed | ..................... | B60J 10/00 |
| | | | | 73/291 |
| 2005/0172712 A1 * | 8/2005 | Nyce | ..................... | G01F 23/263 |
| | | | | 73/304 C |
| 2005/0229700 A1 * | 10/2005 | Chai | ....................... | C02F 1/003 |
| | | | | 73/304 R |
| 2008/0111559 A1 | 5/2008 | Choi | | |
| 2008/0231267 A1 * | 9/2008 | Miyagawa | ............. | G01F 23/38 |
| | | | | 324/207.25 |
| 2009/0165552 A1 * | 7/2009 | Sieh | ..................... | G01F 23/265 |
| | | | | 73/304 C |
| 2014/0305202 A1 * | 10/2014 | Periyathamby | ....... | G01F 23/268 |
| | | | | 73/304 C |

* cited by examiner

COMPARATIVE FUEL-LEVEL DETECTION SYSTEM

RELATED APPLICATIONS

This application claims priority benefit, with respect to all common subject matter, of U.S. Provisional Patent Application No. 62/254,759, filed Nov. 13, 2015, and entitled "COMPARATIVE FUEL-LEVEL DETECTION SYSTEM" (the '759 Provisional Application). The disclosure of the '759 Provisional Application is hereby incorporated herein by reference in its entirety.

BACKGROUND

1. Field

Embodiments of the invention are broadly directed to the determination of an amount of fuel within a fuel system. More specifically, embodiments of the invention are directed to the determination of fuel level via a comparative fuel probe.

2. Related Art

Detecting a fuel level within a fuel tank can be problematic, especially within an exemplary field of aircraft. Detecting an accurate fuel level is of critical importance based upon the danger to the aircraft and the people on board that can result from a failed or inaccurate reading. For many years, capacitive fuel gauges have become the standard in aviation for the detection of fuel level. Capacitive fuel gauges operate by measuring the capacitance between various probes. The fuel is, in essence, working as the dielectric between the probes. The amount of fuel is therefore indicated by the detected capacitance of the summation of all tank probes.

While these capacitive fuel systems can be very accurate, they present numerous disadvantages. First, in order to accurately approximate fuel based upon capacitance, numerous factors must be determined and accounted for in calculation. These factors include permittivity of the fuel (the ability of the fluid to carry an electrical charge, which will vary by fuel blends and additives), the density of the fuel (based upon the various fuel blends and the amount of air contained within the fuel), the temperature of the fuel, the presence of corrosion on the fuel probe, the percentage of humidity or concentration of inerting gas present in the fuel or the fuel tank, the cleanliness of the fuel sensors, the motion of the fuel (based upon the flight dynamics of the vehicle), etc. Second, the sensors and processing equipment that account for the above-discussed factors are excessively heavy and complex. For example, in a large commercial aircraft these various sensors and processors can weigh between fifty and one hundred pounds. The aircraft may additionally have a mechanical drip stick system as an emergency, redundant backup that can be utilized upon failure of the capacitive system.

SUMMARY

Embodiments of the invention solve the above-mentioned problems by providing a fuel-level determination system that simplifies the above-discussed factors and sensors. Embodiments of the invention utilize a comparative fuel probe for determining a correction factor and a plurality of capacitive probes for utilizing the correction factor to determine the fuel level. The corrective factor is determined by comparing a reading of a float-type sensor with the reading of a capacitive sensor.

A first embodiment of the invention is directed to a fuel-level detection system configured to determine a fuel level in a fuel system, the fuel-level detection system comprising a comparative fuel probe, a comparator, and a set of capacitive probes. The comparative fuel probe is associated with the fuel system and includes a capacitive probe assembly configured to provide a comparative capacitive reading, and a float assembly configured to provide a comparative float reading. The capacitive probe assembly is disposed proximate to the float assembly. The comparator is configured to receive the comparative capacitive reading and to receive the comparative float reading, and to determine a corrective factor based at least in part on the comparative capacitive reading and the comparative float reading. The set of capacitive probes is associated with the fuel system. Each capacitive probe within the set of capacitive probes is configured to provide a local capacitive reading. The fuel level in the fuel system is determined by comparing each local capacitive reading from each capacitive probe in the set of capacitive probes with the corrective factor.

A second embodiment of the invention is directed to a comparative fuel probe configured to be added to a fuel system for providing information indicative of a correction factor that can be used to determine a fuel level in the fuel system. The comparative fuel probe comprises a capacitive probe assembly and a float assembly. The capacitive probe assembly includes a capacitive sensor, and a probe body. The capacitive probe assembly is configured to provide information indicative of a comparative capacitive reading. The float assembly includes a float base, a float arm having a float attached thereto, and an orientation sensor for determining an orientation of the float arm relative to the float base. The float assembly is configured to provide information indicative of a comparative float reading.

A third embodiment of the invention is directed to a computerized method of determining a fuel level associated with a fuel system, the method comprising the following steps: acquiring a comparative capacitive reading from a capacitive probe assembly; acquiring a comparative float reading from a float assembly, wherein the capacitive probe assembly is located in proximity to the float assembly such that a relationship between the comparative capacitive reading and the comparative float reading is indicative of conditions in the fuel system; determining a corrective factor based at least in part on a comparison of the comparative capacitive reading and the comparative float reading; receiving a plurality of local capacitive readings from a set of capacitive probes; and determining a fuel level associated with the fuel system based at least in part upon comparing each local capacitive reading of the plurality of local capacitive readings against the corrective factor.

Other embodiments of the invention may be directed to a comparative float assembly that is configured to be added to a capacitive probe, so as to form the above-discussed comparative fuel probe or a system of comparative fuel probes where the float probe component forms a redundant fuel quantity system. Redundant fuel quantity systems are needed to meet lightning and high intensity radiation field ("HIRF") requirements. Still other embodiments of the invention may be directed to a fuel system having an associated fuel-level detection system. Further embodiments of the invention may be directed to a non-transitory computer readable medium having a computer program stored thereon for determining the fuel level within a fuel system. The computer program instructs at least one processing element to perform the steps of a computerized method.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the invention will be apparent from the following detailed description of the embodiments and the accompanying drawing figures.

BRIEF DESCRIPTION OF THE DRAWINGS

Embodiments of the invention are described in detail below with reference to the attached drawing figures, wherein.

The drawing figures do not limit the invention to the specific embodiments disclosed and described herein. The drawings are not necessarily to scale, emphasis instead being placed upon clearly illustrating the principles of the invention.

DETAILED DESCRIPTION

The following detailed description references the accompanying drawings that illustrate specific embodiments in which the invention may be practiced. The embodiments are intended to describe aspects of the invention in sufficient detail to enable those skilled in the art to practice the invention. Other embodiments can be utilized and changes can be made without departing from the scope of the invention. The following detailed description is, therefore, not to be taken in a limiting sense. The scope of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etceteras described in one embodiment may also be included in other embodiments, but is not necessarily included. Thus, the invention can include a variety of combinations and/or integrations of the embodiments described herein.

Figure 1:
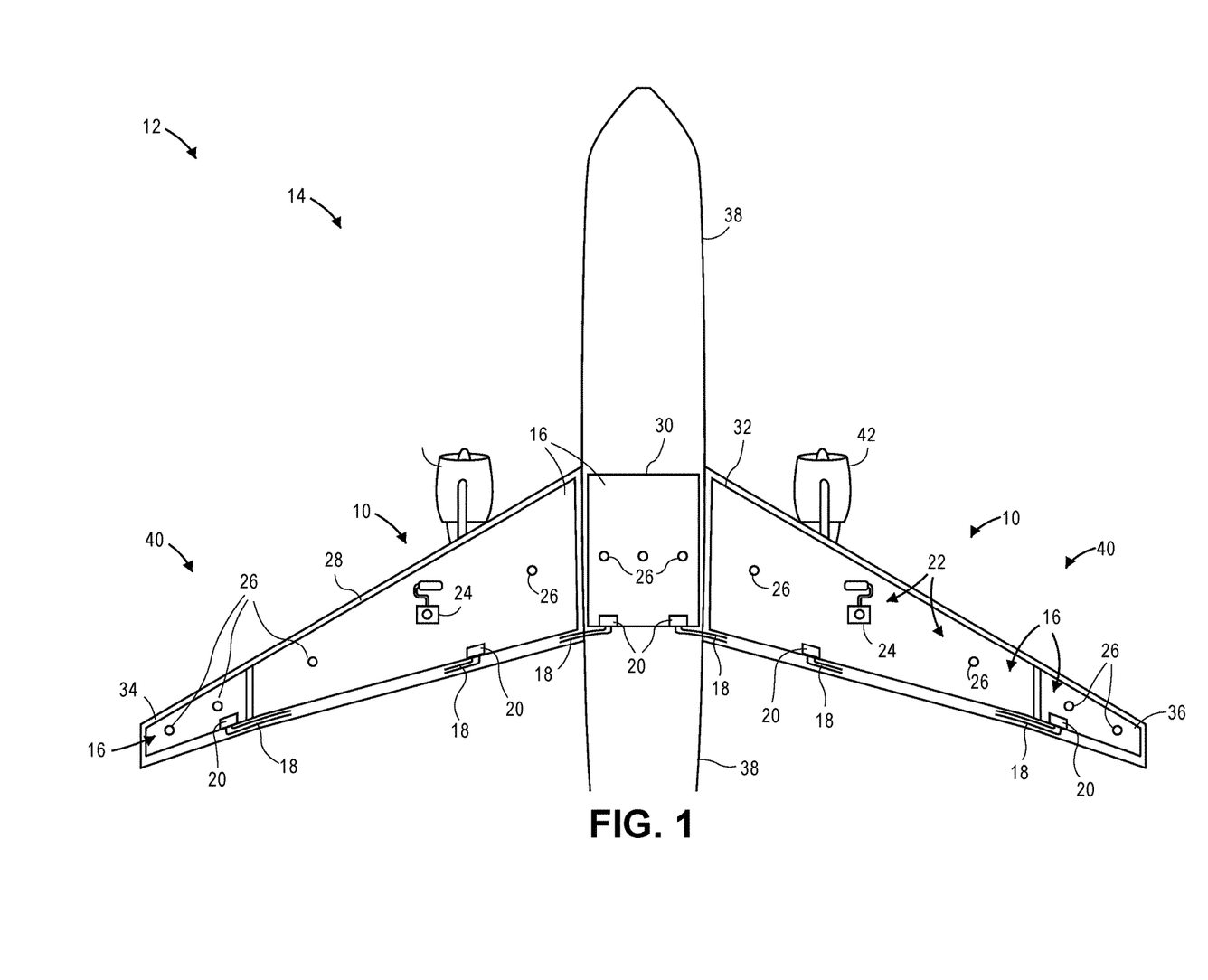
FIG. 1 is a schematic view of fuel-level detection system associated with a fuel system of an aircraft.

Turning to the figures, a general schematic of a fuel system 10 for a vehicle 12 is shown in FIG. 1. The vehicle 12 illustrated is an aircraft 14 as an exemplary field of use for the invention. The fuel system 10 comprises at least one fuel tank 16, at least one fuel line 18, and at least one fuel pump 20. The fuel level within the fuel system 10 is determined by a fuel-level detection system 22, as discussed in depth below. The fuel-level detection system 22 includes a comparative fuel probe 24 that provides information indicative of a corrective factor to be applied to the readings of a set of capacitive probes 26. The readings of the capacitive probes 26 are then adjusted by the corrective factor to determine the correct fuel level within the fuel system 10.

The fuel is stored in the at least one fuel tank 16. In embodiments of the invention such as illustrated in FIG. 1, the fuel system 10 may include a main left fuel tank 28, a main center fuel tank 30, a main right fuel tank 32, a reserve left fuel tank 34, and a reserve right fuel tank 36. The various fuel tanks 16 may be located in a fuselage 38 of the aircraft 14, a wing 40 of the aircraft 14, a tail of the aircraft 14, externally to the aircraft 14, or other location associated with the aircraft 14. In other embodiments, the fuel system 10 may additionally or alternatively include other fuel tanks, not illustrated, such as an aft body tank, an upper deck tank, a forward auxiliary tank, a right saddle tank, a left saddle tank, a tail tank, or other fuel tanks. In some embodiments of the invention, the main left fuel tank may include a left inboard fuel tank and a left outboard fuel tank, and the main right fuel tank may include a right inboard fuel tank and a right outboard fuel tank. It should be appreciated that various aircraft 14, and other vehicle 12s, may include any number and disposition of fuel tanks. As with the other drawings, the illustrated number and disposition are only exemplary.

As shown in FIG. 1, the fuel pump 20 sends the fuel from the respective fuel tank 16 through the fuel line 18 to an engine 42 or other component of the vehicle 12. The fuel pump 20 pressurizes the fuel in the fuel line 18 so as to force the fuel into the engine 42 or other component. Various fuel pump 20 and fuel line 18 configurations may be utilized, and the illustrated configuration is simplified to aid the understanding for the reader.

As used herein the "fuel level" is an estimation of the amount of fuel that is currently in the fuel system 10. The fuel level may be expressed in any of numerous ways. Exemplary expression of the fuel level can include volume (such as gallons or liters), weight (such as pounds or kilograms), distance remaining (such as miles, nautical miles, or kilometers), operating time remaining, operating time until a certain event (such as a safe return point), a percentage, a graphical representation, a color, a string, or other representation of the amount of fuel in the fuel system 10. As should be appreciated, providing a pilot, or other operator, with an accurate fuel level is important for safe operation of the aircraft 14.

If the fuel level were determined solely by the set of capacitive probes 26, errors based upon the various factors (discussed above) that affect capacitive properties of the fuel would introduce errors into the determination. The output of the comparative fuel probe 24 is analyzed so as to determine the correction factor that should be applied to other capacitive probes 26 in other areas of the fuel system 10. Because the fuel within the fuel tank 16 moves around. In embodiments of the invention, one or a few comparative fuel probes 24 may be used in each fuel tank 16 and that the calculated correction factor is substantially constant throughout the fuel system 10.

Embodiments of the invention are directed to a fuel-level detection system 22 configured to determine a fuel level in the fuel system 10. Generally, the fuel-level detection system 22 comprises the comparative fuel probe 24 and the set of capacitive probes 26. The comparative fuel probe 24 is associated with the fuel system 10 and provides a comparative capacitive reading, and a comparative float reading. A comparator engine, as discussed below, is configured to receive the comparative capacitive reading and to receive the comparative float reading, and to determine a corrective factor based at least in part on the comparative capacitive reading and the comparative float reading. The set of capacitive probes 26 is associated with the fuel system 10. Each capacitive probe 26 within the set of capacitive probes 26 is configured to provide a local capacitive reading. The fuel level in the fuel system 10 is determined by comparing each local capacitive reading from each capacitive probe 26 in the set of capacitive probes 26 with the corrective factor.

Figure 2:
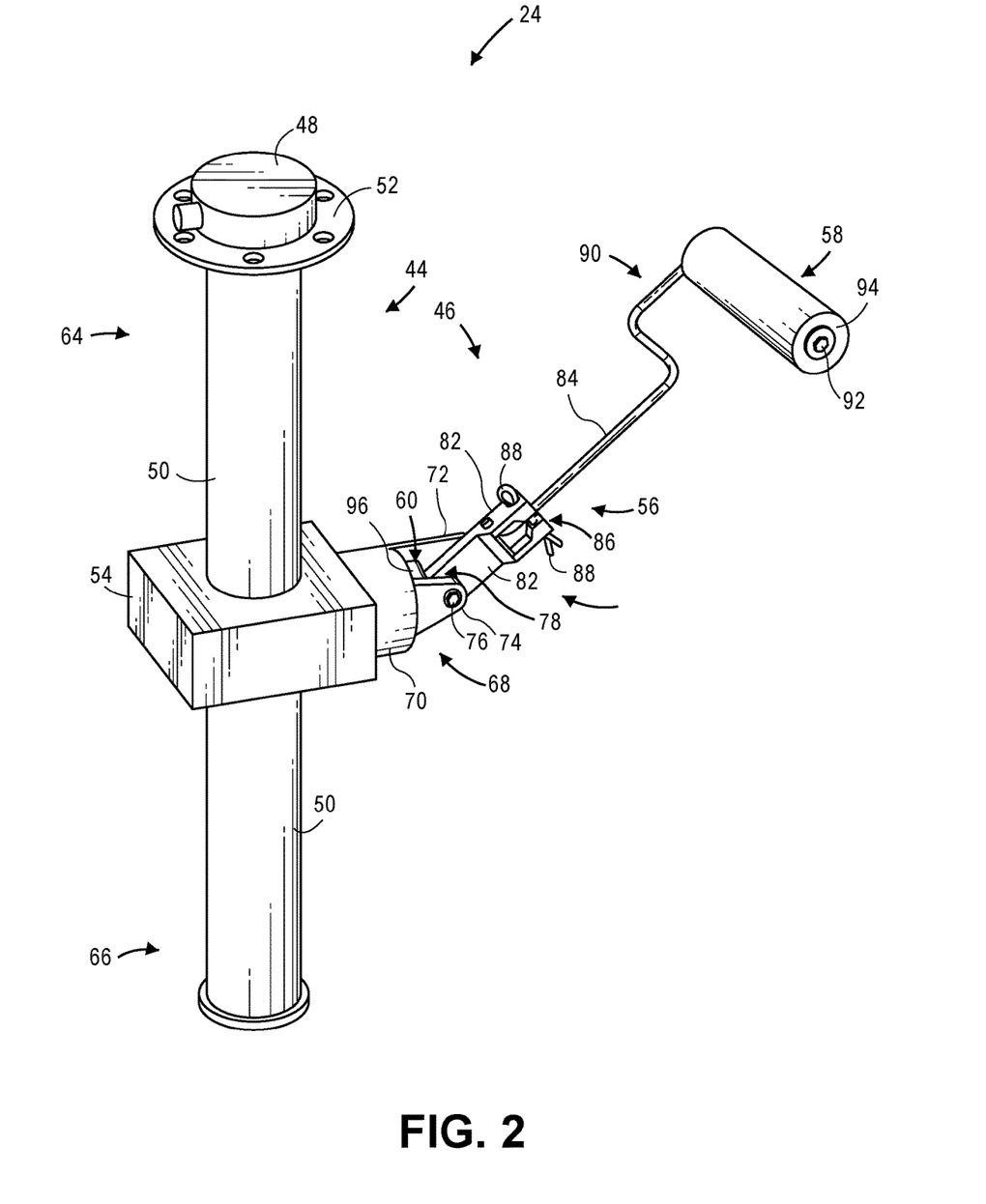
FIG. 2 is a perspective view of a comparative fuel probe as viewed from a first side, being in a maximum level position.
Figure 3:
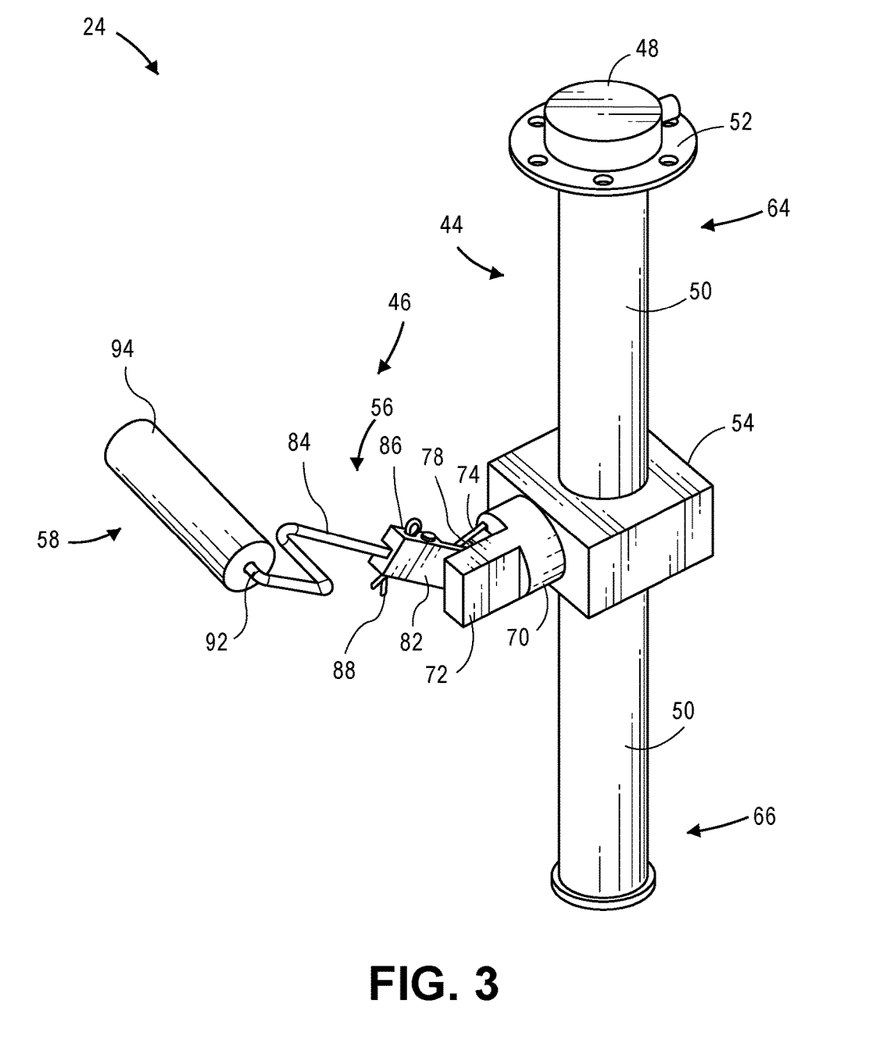
FIG. 3 is a perspective view of the comparative fuel probe of FIG. 2, as viewed from a second side.
Figure 4:
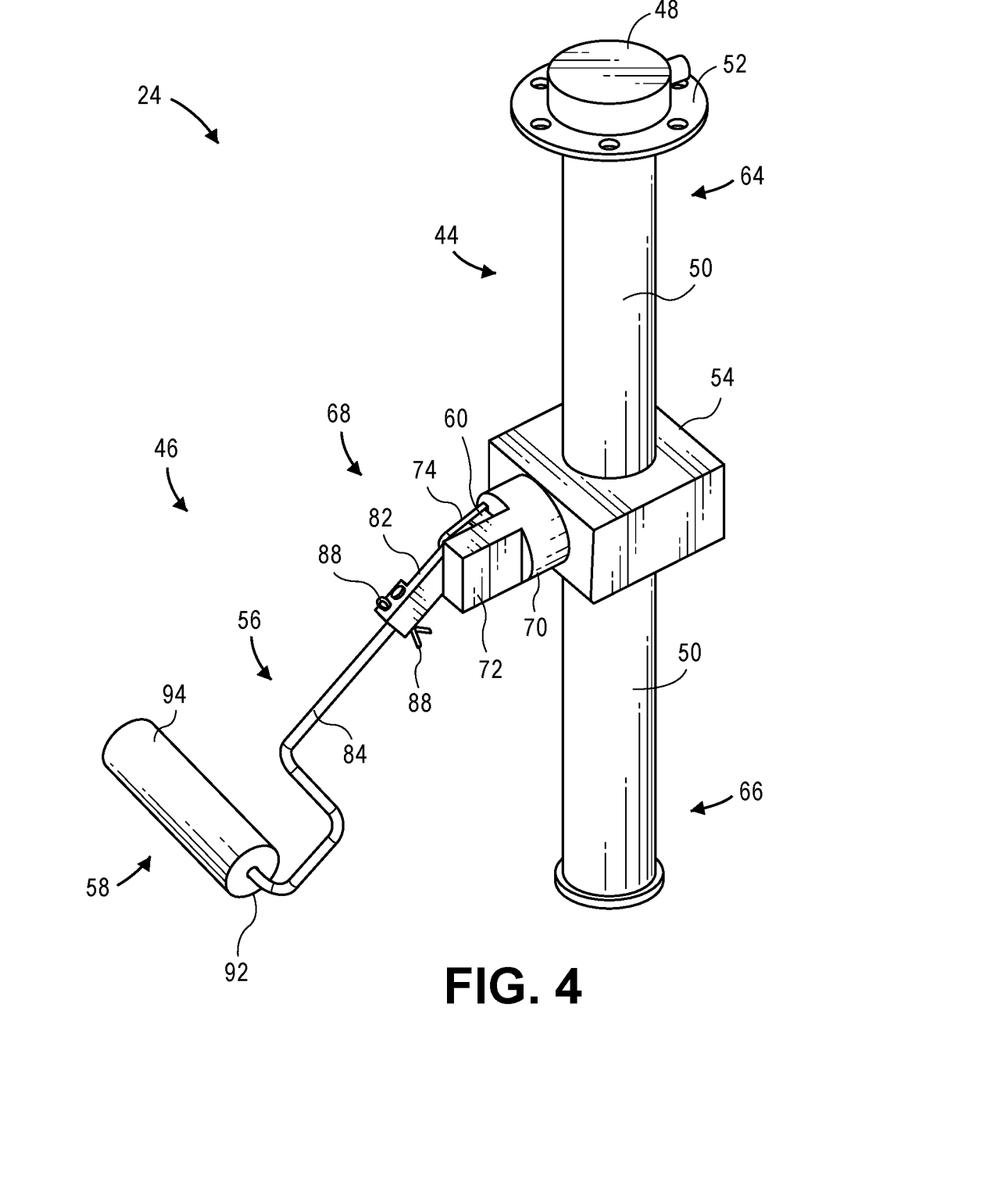
FIG. 4 is a perspective view of the comparative fuel probe of FIG. 3, being in a minimum level position.

Before discussing the other components of the fuel-level detection system 22, the components of the comparative fuel probe 24 will now be discussed in greater detail. As can be seen in FIGS. 2-4, the comparative fuel probe 24 broadly comprises a capacitive probe assembly 44 and a comparative float assembly 46. In some embodiments of the invention, the comparative fuel probe 24 is configured to be added to the fuel system 10 for providing information indicative of a correction factor that can be used to determine a fuel level in the fuel system 10. In other embodiments of the invention, the comparative fuel probe 24 is originally manufactured as a component of the fuel system 10.

Figure 5:
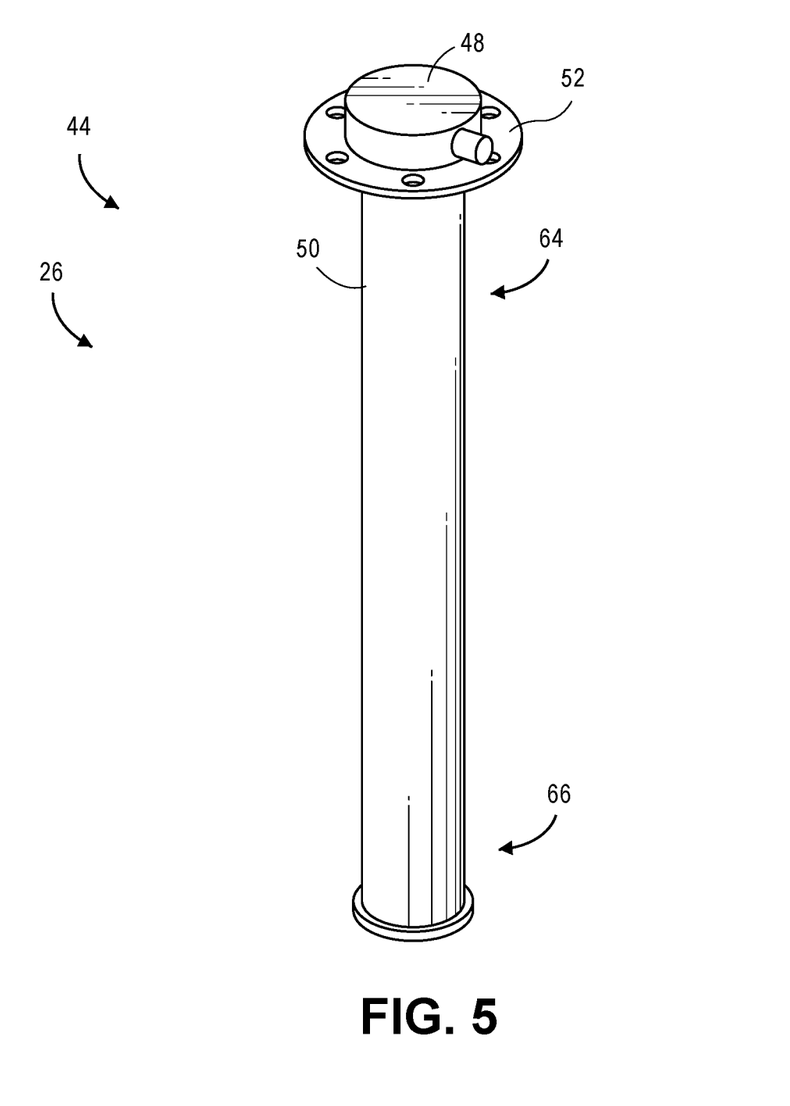
FIG. 5 is a perspective view of a capacitive probe assembly of the comparative fuel probe.

In embodiments of the invention, the capacitive probe assembly 44 includes a capacitive sensor 48, and a probe body 50, as best illustrated in FIG. 5. The capacitive probe assembly 44 is configured to provide information indicative of a comparative capacitive reading. The comparative capacitive reading is an electronic (e.g., analog or digital) representation of the capacitive sensor 48 that is associated with the probe body 50. The comparative capacitive reading provides an exemplary capacitive reading for comparison to a comparative float reading, as discussed below. The capacitive probe assembly 44, in embodiments of the invention, is substantially similar to at least one of the set of capacitive probes 26, such that the comparative capacitive reading and a hypothetical adjacent local capacitive reading would be substantially similar. In this way, the corrective factor can be utilized to adjust the respective local capacitive readings. In some embodiments, the comparative float assembly 46 (discussed below) is added to an existing capacitive probe 26 of the set of capacitive probes 26. In other embodiments, the capacitive probe assembly 44 is selected based upon the other capacitive probes 26 in the set of capacitive probes 26.

The probe body 50 includes a tank-wall interface 52. The tank-wall interface 52 or similar structure is secured to the wall of the fuel tank 16, such that the capacitive probe 26 is oriented vertically within the tank. In embodiments of the invention, at least the probe body 50 is substantially hollow, so as to allow wires to pass through the comparative probe assembly and through the tank-wall interface 52 to various other components and computer systems. The probe body 50 may be cylindrical with an open lower end so as to allow fuel to fill the hollow interior of the probe body 50, up to the current fuel level.

The comparative probe assembly is fixed primarily in a vertical orientation in the tank and is secured to the tank wall through the probe base (i.e. the tank-wall interface 52) or similar structure. It should be appreciated that in various embodiments of the invention, the comparative probe assembly may be oriented as illustrated in FIGS. 2-4 or inverted from the illustrated orientation (e.g., such that the capacitive sensor 48 is oriented downward). The capacitive probe 26 may contain all manner of supports and mechanical ports to contain and slow fluid motion within the probe body 50 of the capacitive probe 26. It should be appreciated that the various components of the capacitive probe 26 discussed herein may be monolithic.

Figure 6:
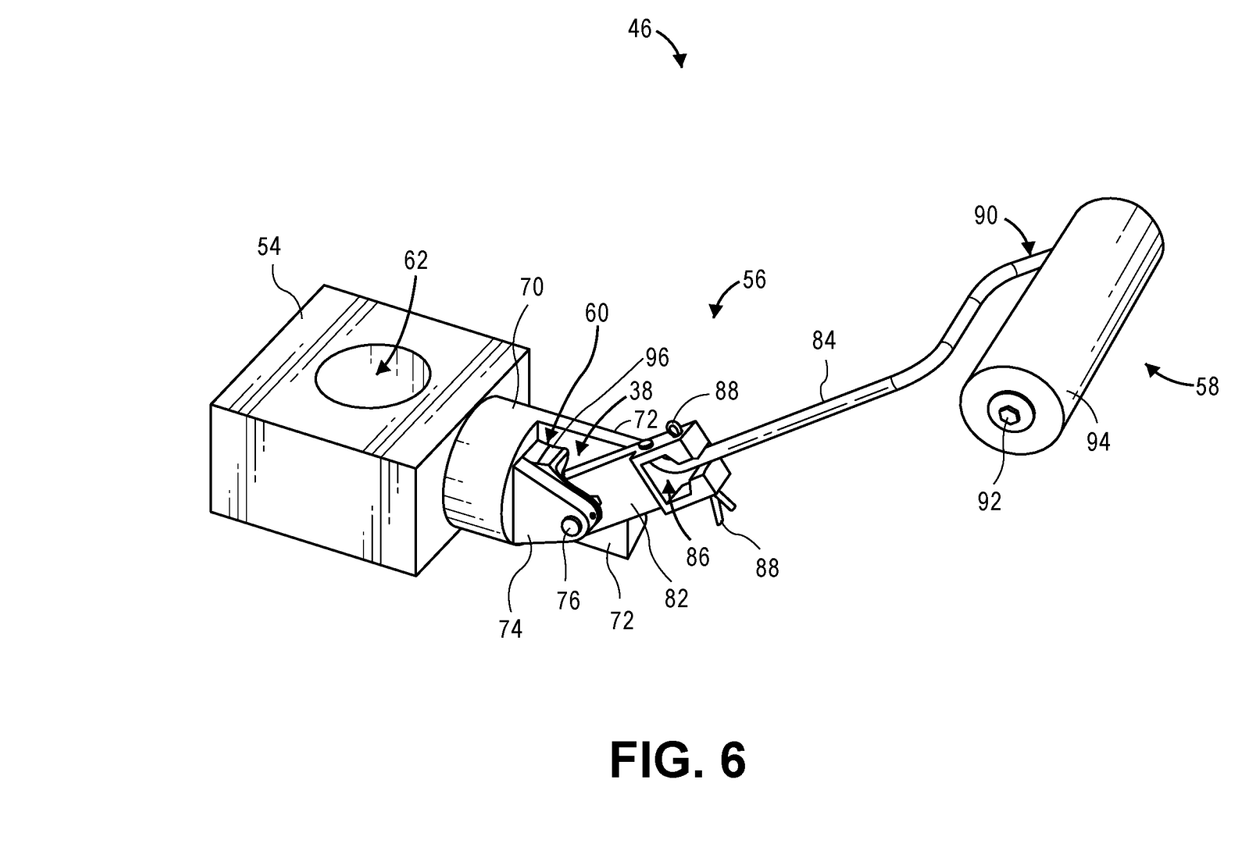
FIG. 6 is a perspective view of a float probe assembly of the comparative fuel probe.

In embodiments of the invention, as best illustrated in FIG. 6, the comparative float assembly 46 includes a float base 54, a float arm 56, a float 58, and an orientation sensor 60. The float base 54 is secured to the probe body 50 of the capacitive probe assembly 44. In embodiments of the invention, the float base 54 presents an opening 62 for receipt of the probe body 50 therein. In embodiments of the invention, the float base 54 is configured to be secured along the probe body 50 between an upper end 64 and a lower end 66 (e.g., substantially in a middle segment of the probe body 50). This allows the float arm 56 to travel between a maximum position (as illustrated in FIGS. 2 and 3) and a minimum position (as illustrated in FIG. 4). However, as noted above, in embodiments of the invention the comparative fuel assembly is inverted from the illustrated orientation. In these embodiments, the maximum position is illustrated in FIG. 4 and the minimum positions are illustrated in FIGS. 2 and 3.

In other embodiments of the invention, not illustrated, the float base 54 may be secured at the upper end 64 of the probe body 50 such that the maximum position is substantially horizontal, or to the lower end 66 of the probe body 50 such that the minimum position is substantially horizontal. In embodiments of the invention, the float base 54 is substantially square shaped as viewed from above. In other embodiments of the invention, the float base 54 is another shape as viewed from above, such as a circle, an ellipse, a D-shape, a hexagon, or other shape. The float base 54 presents the opening 62 within square shape, or other shape. In embodiments of the invention, the opening 62 is circular shaped so as to receive a circular-shaped probe body 50 therein.

In embodiments of the invention, as best illustrated in FIG. 6, the float base 54 includes a float pivot 68. The float pivot 68 extends laterally from the float base 54. The float pivot 68 is configured to receive the float arm 56 (as discussed below). The float pivot 68 allows the float arm 56 to pivot relative thereto. Typically, the float pivot 68 will allow the float arm 56 to freely (or substantially freely) pivot. By allowing the float arm 56 to freely pivot, the float 58 may remain substantially atop the fuel within the fuel tank 16. In this way, the angle of the float arm 56 relative to the float pivot 68 is indicative of the fuel level. In embodiments of the invention, the float pivot 68 comprises a pivot base 70, a first pivot protrusion 72, a second pivot protrusion 74, and a pivot pin 76. The pivot base 70 extends laterally from the float base 54. The first pivot protrusion 72 and the second pivot protrusion 74 each extend laterally from the float base 54. The first pivot protrusion 72 is substantially parallel to the second pivot protrusion 74, so as to present a gap 78 therebetween. The pivot pin 76 traverses the gap 78 and a corresponding opening (not illustrated) in the float arm 56 so as to pivotably secure the float arm 56.

The float arm 56 is pivotably secured at a proximal end 80 to the float pivot 68 and extends therefrom. In embodiments of the invention, the float arm 56 comprises an arm plate 82, an arm rod 84, and a rod-securing mechanism 86. The arm plate 82 fits within the gap 78 presented between the first pivot protrusion 72 and the second pivot protrusion 74. The arm plate 82 presents the opening (not illustrated) for the receipt of the pivot pin 76 therethrough. The rod-securing mechanism 86 is secured to or monolithic with the arm plate 82. In embodiments of the invention, the rod-securing mechanism 86 includes a recess for receipt of the arm rod 84 therein. The arm rod 84 is secured within the recess by a pin 88. In embodiments of the invention, a proximal end 80 of the arm rod 84 is angled, bent, flared, or presents another shape so as to complementarily nest with the recess. The arm rod 84 may also include a curved distal end 90. The curved distal end 90 is configured to center the float 58 along the arm plate 82 (so as to prevent a moment force being imparted on the pivot pin 76) and perpendicular thereto.

The float 58 is secured to the curved distal end 90 of the float arm 56. In embodiments of the invention, the float 58 is substantially perpendicular to the arm rod 84 (other than the curved distal end 90). The float 58 is perpendicular to the arm rod 84 such that the float 58 can be fully in contact with a surface of the fuel regardless of the position of the float arm 56 relative to the float base 54. The float 58 is formed of an inner traversing rod 92 and an outer buoyant segment 94. The outer buoyant segment 94 is formed of a buoyant material such that the float 58 remains substantially atop the surface of the fuel. The outer buoyant segment 94 may also freely rotate about the inner traversing rod 92.

In embodiments of the invention, the orientation sensor 60 is disposed on the pivot base 70 or the float base 54. The orientation sensor 60 is configured for determining an orientation of the float arm 56 relative to the float base 54. The comparative float assembly 46 is configured to provide information indicative of a comparative float reading, as discussed below.

The comparative float assembly 46 provides a direct indication of the fuel level within the tank. In embodiments of the invention, the orientation sensor 60 detects an angle of the float arm 56 relative to the float base 54. In some embodiments, the orientation sensor 60 is a magneto-resistive sensor 96. The magneto-resistive sensor 96 detects the level of the comparative float assembly 46 to give a "true" reading of the local fuel level. As discussed above, the float 58 is buoyant, so as to remain substantially level with a top surface of the fuel within the fuel tank 16. The float pivot 68 is secured to the float base 54, so as to pivot upward and downward therefrom. The float arm 56 is secured to the float pivot 68 and a proximal end 80 and secured to the float 58 at a distal end. The float 58 is therefore configured to pivot between a maximum local level and a minimum local level relative to the capacitive probe 26, as shown in FIGS. 3 and 4, respectively. The float 58 being at the maximum level is indicative that the fuel level is full or substantially full, at least in that local area of the fuel tank 16. The float 58 being at the minimum level is indicative that the fuel level is substantially empty or near the bottom of the capacitive probe 26.

Figure 7:
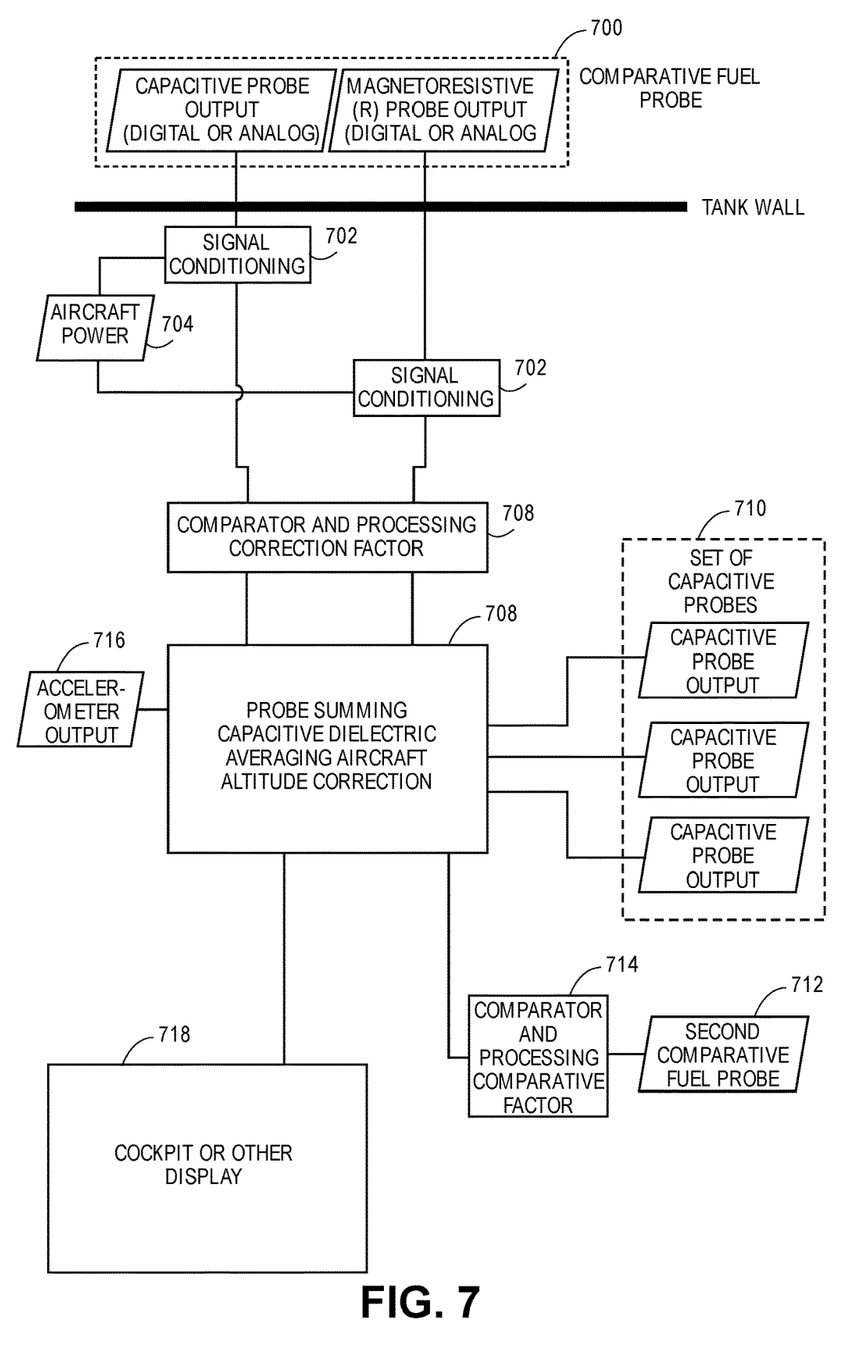
FIG. 7 is a schematic diagram of the various electronic components of the fuel-level detection system.

The various electronic components of the fuel-detection system and the outputs thereof are illustrated in FIG. 7. These various electronic components may perform the steps of a method for determining the fuel level in the fuel system 10, as discussed below and illustrated in FIG. 8. The electronic components may be distributed throughout the aircraft 14 as desired. Generally, the outputs 700 from the comparative fuel probe 24 are analyzed to determine the correction factor. In order to determine the correction factor, the outputs 700 may be conditioned by signal conditioners 702 that are associated with an aircraft power system 704.

The comparative fuel probe 24 outputs information indicative of the fuel level in both a capacitive output and a magneto-resistive output. These outputs 700 may be digital or analog, depending on the type of sensors utilized. The outputs are safely conditioned externally to the tank wall and transmitted for analysis. A comparator engine 706 analyzes the two respective outputs to determine the correction factor. It should be appreciated that in embodiments of the invention, the comparator 706 may be located adjacent to the comparative fuel probe 24. As such, signal conditioning 702 may take place after the comparator 706. The correction factor accounts for all of the above-discussed factors in a single value, expression, equation, or other representation. Instead of accommodating for the various factors individually, as is common in the prior art as discussed above, each using their own separate sensors and inputs, the correction factor provides an average or a combination of the factors.

The correction factor is a measure of the local capacitive dielectric properties as compared to a "true" fuel reading provided by the magneto-resistive sensor 96 and the float 58. The close correspondence in time and location of the two outputs allows for their comparison. For example, the "true" fuel reading provided by the comparative float assembly 46 is accurate for the local tank fuel condition, whether on the ground or in flight as fluid motion is captured equally by both systems. Mechanical lag by the float 58 is matched by the fluid ports inherent in most capacitive fuel sensor designs. This allows for the correction factor to be utilized by other capacitive probes 26 during the flight in order to determine the fuel level, as discussed below.

The correction factor may also be continuously or periodically updated during the flight (or other vehicular operation). The comparative fuel probe 24 may continue to perform readings so as to keep the correction factor accurate and updated in response to various changing conditions during the flight. The "true" fuel reading may also be analyzed as being indicative of the fuel level. The correction factor is then utilized by a probe summing engine 708 to determine the amount of fuel in the fuel system 10, as discussed below.

In embodiments of the invention, the fuel-level detection system 22 further comprises the set of capacitive probes 26 associated with the fuel system 10. Each capacitive probe 26 within the set of capacitive probes 26 is configured to provide a local capacitive reading 710. The fuel level in the fuel system 10 is then determined by comparing each local capacitive reading from each capacitive probe 26 in the set of capacitive probes 26 with the corrective factor, as discussed below.

In embodiments of the invention, a first capacitive probe of the set of capacitive probes 26 is disposed in a first fuel tank, and a second capacitive probe of the set of capacitive probes 26 is disposed in a second fuel tank of the fuel system 10. The local capacitive reading of the second capacitive probe is compared to the corrective factor derived from the comparative fuel probe 24 that is associated with the first fuel tank. This is because the corrective factor would not be substantially different for the second fuel tank as the conditions between the fuel tanks 16 are substantially similar and the fuel therein is also substantially similar.

In some embodiments of the invention, the fuel-level detection system 22 includes more than one comparative fuel probe 24, so as to determine multiple corrective factors. In these embodiments, an output 712 from a second comparative fuel probe 24 are sent to a comparator 714 for processing of the corrective factor. It should be appreciated that the comparator 714 may be the same or distinct from the comparator 706 discussed above. The multiple corrective factors may then be averaged (or otherwise compared and analyzed) to determine a master corrective factor. In other embodiments, each corrective factor may be utilized on corresponding capacitive probes 26. For example, a first comparative fuel probe that is associated with the first fuel tank of the fuel system 10 may be utilized for determining the fuel level in the first tank, and a second comparative fuel probe that is associated with the second fuel tank of the fuel system 10 may be utilized for determining the fuel level in the second tank. The first comparative fuel probe provides information indicative of a first corrective factor, and the second comparative fuel probe provides information indicative of a second corrective factor. This is because some conditions may vary between the fuel tanks 16. For example, fuel tanks 30 that are internal to the fuselage 38 may be warmer than fuel tanks 28,32,34,36 internal to the wings 40. The redundant comparative fuel probes 24 may also be utilized such that a failure of one comparative fuel probe 24 will not severely affect the computation of a corrective factor from the other comparative fuel probe 24.

A plurality of capacitive probes 26 is distributed throughout the fuel tank and the various other components of the fuel system 10. In embodiments of the invention, the plurality of capacitive probes 26 is spaced longitudinally and laterally throughout the aircraft 14, as illustrated in FIG. 1. Each capacitive probe 26 produces its own output regarding a local reading (e.g., the local capacitive reading). The capacitive probes 26 have advantages in that they can be placed in various locations throughout the fuel tank 16, the fuel lines 18, and other components. In many of these locations, a float-based sensor would be too large and obstructive. The fuel-detection system therefore utilizes the corrective factor derived from the comparative fuel probe 24 to correct the reading of the capacitive probes 26.

At least a portion of these outputs 700,710,712 are then all acquired by the probe summing engine 708. The probe summing engine 708 compares the outputs of the plurality of capacitive probes 26 to the calculated correction factor. The probe summing engine may also take into account other flight dynamic outputs 716 such as the current aircraft attitude, aircraft acceleration, ambient pressure, and the like. The probe summing engine may also compare various correction factors. For example, multiple comparative fuel probes 24 may be distributed throughout the fuel tank. As another example, many aircraft 14 have two fuel tanks, each of which may be utilizing a separate comparative fuel probe 24. The probe summing engine may therefore use a correction factor that corresponds with the given fuel tank, within the given area, utilize an average of multiple correction factors, or the like. The probe summing engine may also compare the current correction factor to previous correction factors, predetermined thresholds, and the like.

The determined fuel level is thereafter displayed in the cockpit or other display 718. The determined fuel level may also be supplied to various other aircraft systems such as an aircraft trim system or the aircraft avionics. The determined fuel level is thereafter periodically or continuously updated so as to provide accurate and timely fuel level information to the pilot and the other aircraft systems.

Figure 8:
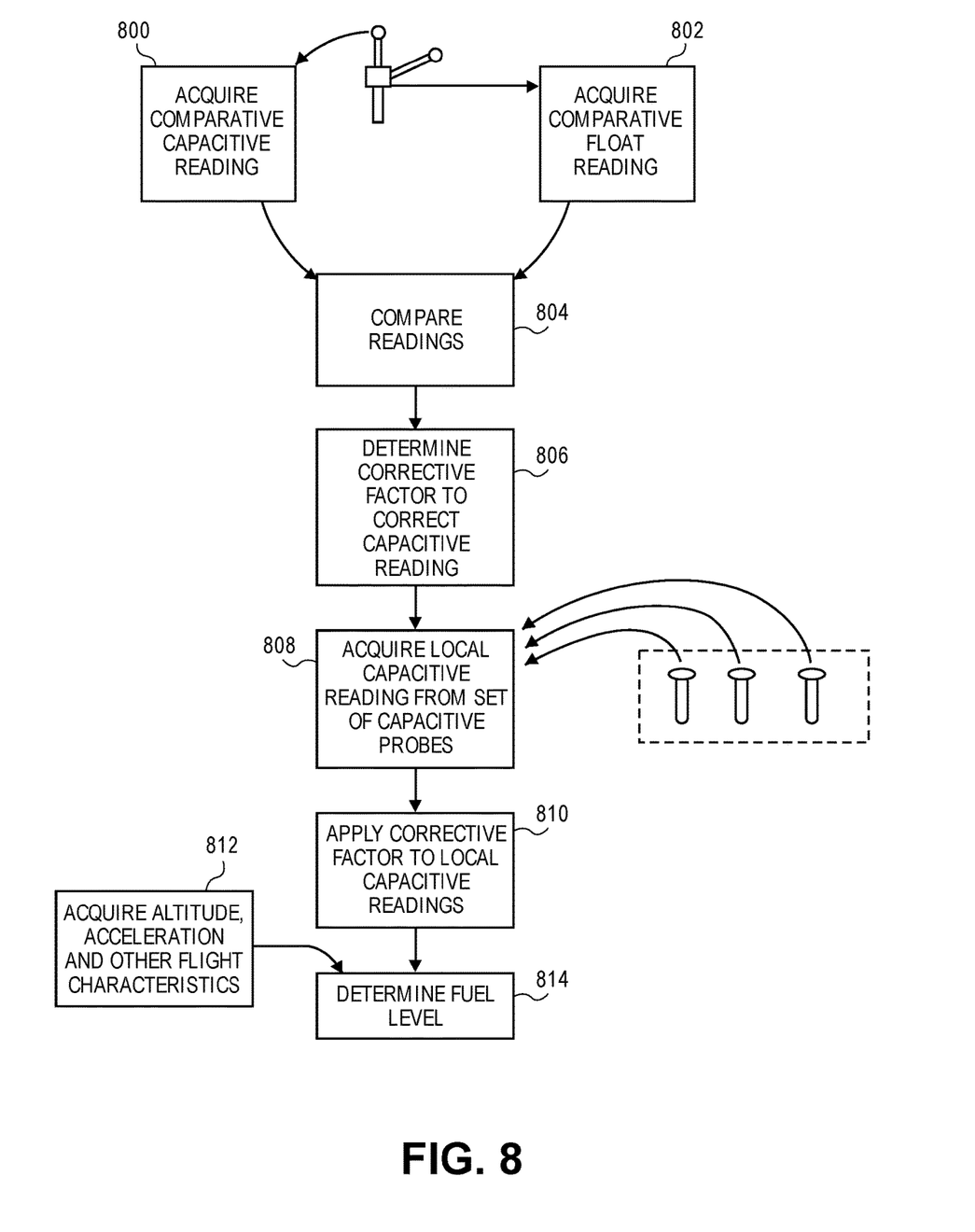
FIG. 8 is a flow diagram illustrating exemplary steps for determining the fuel level within the fuel system.

Turning now to FIG. 8, a method of determining the fuel level within the fuel system 10 will now be discussed. In embodiments of the invention, the various steps of this method may be performed by the probe summing engine, the comparator engine, and/or other computerized components (referred to herein individually or collectively as a "processing element"). Embodiments of the invention are directed to a non-transitory computer readable medium having a computer program stored thereon for determining the fuel level within a fuel system 10, wherein the computer program is configured to instruct the processing element to perform the discussed steps.

In Step 800, the processor acquires a comparative capacitive reading from a capacitive probe assembly 44. In Step 802, the processor acquires a comparative float reading from the comparative float assembly 46. In some embodiments, the processor acquiring these respective readings may be located at or near the comparative fuel probe 24. It should also be appreciated that, as illustrated in FIGS. 2-4, the capacitive probe assembly 44 is located in proximity to the comparative float assembly 46 such that a relationship between the comparative capacitive reading and the comparative float reading is indicative of conditions in the fuel system 10.

In Step 804, the processor compares the comparative capacitive reading to the comparative float reading. In Step 806, the processor determines a corrective factor based at least in part on a comparison of the comparative capacitive reading and the comparative float reading. For example, the processor may assume that the corrective float reading (or an average thereof) is the "true" reading of the fuel level at that particular location for that particular time period. The comparative capacitive reading may therefore need to be adjusted such that the comparative capacitive reading would reflect the same fuel level as the comparative float reading is indicating. It should be appreciated that the comparative float reading and the comparative capacitive readings may be in different units or indications.

In Step 808, the processor acquires a plurality of local capacitive readings from a set of capacitive probes 26. The set of capacitive probes 26 provide local capacitive readings from various locations throughout the fuel system 10 (such as various fuel tanks 16, various locations within each fuel tank 16, various fuel lines 18, and other locations). Example locations of the set of capacitive probes 26 are illustrated in FIG. 1.

In Step 810, the processor determines the fuel level associated with the fuel system 10 based at least in part upon comparing each local capacitive reading of the plurality of local capacitive readings against the corrective factor. In embodiments of the invention, the fuel level is determined by multiplying (or otherwise applying) the correction factor to each of the respective local capacitive readings. The corrected local capacitive readings are analyzed with known information about the fuel system 10. For example, a certain capacitive probe 26 may be disposed within a 100-gallon fuel tank, the local capacitive reading may be 70% capacity, and the correction factor may be 1.1. As such, to determine the fuel level within that fuel tank 0.7 (70%) is multiplied by 1.1 to determine that 0.77 (77%) is the corrected capacitive reading. 77% capacity on the 100-gallon fuel tank indicates that approximately 77 gallons are present within the fuel tank. Similar calculations will also be performed for other fuel tanks 16, fuel lines 18, and the like to determine the total fuel level for the fuel system 10.

In some embodiments of the invention, the comparative capacitive reading is acquired over time such that an average comparative capacitive reading can be determined and the comparative float reading is acquired over time such that an average comparative float reading can be determined. In these embodiments, the step of determining the corrective factor is performed by comparing the average comparative float reading to the average comparative capacitive reading. The corrective factor is indicative of a change to the average comparative capacitive reading that would bring alter the average comparative capacitive reading to reflect the average comparative float reading.

In other embodiments, a first comparative capacitive reading and a first comparative float reading are associated with a first time stamp, and a second comparative capacitive reading and a second comparative float reading are associated with a second time stamp. Additional comparative capacitive readings and comparative float readings may be associated with additional time stamps. In these embodiments, non-linear correlations, changing conditions, and other factors may be determined by analyzing the respective readings at the respective timestamps.

In embodiments of the invention, the method further comprises the steps of conditioning a first signal indicative of the comparative capacitive reading, and conditioning a second signal indicative of the comparative float reading. The conditioning of the first signal and the second signal may be performed locally on the comparative fuel probe 24 or remotely, such as at a hub, switch or other relay station. The method may further comprise steps of sending the first signal and the second signal to the comparator engine.

In Step 812, the method further comprises the steps of acquiring external aircraft information that may be indicative of the fuel level within the fuel system 10. This may include attitude information, acceleration information, course and heading information, fuel consumption information, engine usage information, and other flight or aircraft characteristics.

In embodiments of the invention, the method further comprises the step of acquiring an attitude reading from an aircraft attitude device, such as an attitude and heading reference system (AHRS). In these embodiments, the above-discussed step of determining the fuel level associated with the fuel system 10 is further based at least in part on the attitude reading from the aircraft attitude device. For example, the attitude of the aircraft 14 can affect the fuel level respective to various capacitive probes 26 within the fuel system 10. The attitude information may therefore be utilized to further correct and adjust the fuel level determination to more accurately reflect the actual fuel level in the fuel system 10.

In embodiments of the invention, the method further comprises the step of acquiring an acceleration reading from an aircraft acceleration device. In these embodiments, the above-discussed steps of determining the fuel level associated with the fuel system 10 is further based at least in part on the acceleration reading from the aircraft acceleration device. Similarly to the attitude of the aircraft 14, acceleration can affect the reading of the capacitive probes 26.

In some embodiments of the invention, a first comparative sensor fuel probe XX is arranged in a fore location and a second comparative fuel probe XX is arranged in an aft location within the fuel tank. The comparative fuel levels may then be determined as a correction factor can be obtained for aircraft attitude without relying on other aircraft inputs. This fore-aft configuration may simplify calculations of the correction factors for attitude.

In embodiments of the invention, the method further comprises the following steps: acquiring a second comparative capacitive reading from a second capacitive probe assembly 44; acquiring a second comparative float reading from a second float assembly, wherein the second capacitive probe assembly 44 is located in proximity to the second float assembly such that a relationship between the comparative capacitive reading and the comparative float reading is indicative of conditions in the fuel system 10, wherein the capacitive probe assembly 44 and the comparative float assembly 46 are associated with a first tank of the fuel system 10, wherein the second capacitive probe assembly 44 and the second float assembly are associated with a second tank of the fuel system 10; determining a second corrective factor based at least in part on a comparison of the second comparative capacitive reading and the second comparative float reading, wherein the step of determining the fuel level associated with the fuel system 10 is based at least in part upon comparing each local capacitive reading of the plurality of capacitive readings against the corrective factor.

The invention may comprise computing devices, servers, database, and communications networks to facilitate the functions and features described herein. The computing devices and servers may comprise any number and combination of processors, controllers, integrated circuits, programmable logic devices, or other data and signal processing devices for carrying out the functions described herein, and may additionally comprise one or more memory storage devices, transmitters, receivers, and/or communication busses for communicating with the various devices of the system. In various embodiments of the invention, the computing devices may comprise a memory element, a communication component, a display, a user interface, and a printer.

In embodiments of the invention, the computing devices and/or databases may implement the computer program and/or code segments of the computer program to perform some of the functions described herein. The computer program may comprise a listing of executable instructions for implementing logical functions in the user device. The computer program may be embodied in any computer readable medium for use by or in connection with an instruction execution system, apparatus, or device, and execute the instructions. In the context of this application, a "computer readable medium" may be any means that may contain, store, communicate, propagate, or transport the program for use by or in connection with the instruction execution system, apparatus, or device. The computer readable medium may be, for example, but not limited to, an electronic, magnetic, optical, electro-magnetic, infrared, or semiconductor system, apparatus, device or propagation medium. More specific, although not inclusive, examples of the computer readable medium would include the following: a portable computer diskette, a random access memory (RAM), a read only memory (ROM), an erasable, programmable, read only memory (EPROM or flash memory), and a portable compact disk read only memory (CDROM), and combinations thereof. The various actions and calculations described herein as being performed by or using the computer program may actually be performed by one or more computers, processors, or other computational devices, such as the exemplary device described herein, independently or cooperatively executing portions of the computer program.

Although the invention has been described with reference to the exemplary embodiments illustrated in the attached drawings, it is noted that equivalents may be employed and substitutions made herein without departing from the scope of the invention as recited in the claims.

Having thus described various embodiments of the invention, what is claimed as new and desired to be protected by Letters Patent includes the following:

1. A fuel-level detection system configured to determine a fuel level in a fuel system, the fuel-level detection system comprising:
 a comparative fuel probe associated with the fuel system, including—
  a capacitive probe assembly configured to provide a comparative capacitive reading, a float assembly configured to provide a comparative float reading,
wherein the capacitive probe assembly is disposed proximate to the float assembly;
a comparator configured to receive the comparative capacitive reading and to receive the comparative float reading,
wherein the comparator is configured to determine a corrective factor based at least in part on the comparative capacitive reading and the comparative float reading; and
a first capacitive probe disposed in a first fuel tank of the fuel system,
a second capacitive probe disposed in a second fuel tank of the fuel system,
wherein each of the first capacitive probe and the second capacitive probe is configured to provide a local capacitive reading,
wherein the fuel level in the fuel system is determined by comparing each local capacitive reading with the corrective factor.

2. The fuel-level detection system of claim 1,
wherein the comparative fuel probe includes a capacitive sensor and a probe body,
wherein the probe body is disposed at least partially within the first fuel tank of the fuel system,
wherein the probe body presents a tank-wall interface that is secured to a tank wall of the first fuel tank and extends inward to the fuel tank.

3. The fuel-level detection system of claim 2, wherein the capacitive sensor is disposed externally to the first fuel tank and secured to the tank-wall interface.

4. The fuel-level detection system of claim 2, wherein the float assembly comprises:
a float base that is secured to the probe body;
a float arm pivotably attached at a proximal end to the float base;
a float device attached to a distal end of the float arm; and
an orientation sensor for determining an orientation of the float arm relative to the float base,
wherein the orientation of the float arm is determined by the position of the float device atop the fuel within the first fuel tank.

5. The fuel-level detection system of claim 1, wherein the local capacitive reading of the second capacitive probe is compared to the corrective factor derived from the comparative fuel probe that is associated with the first fuel tank.

6. The fuel-level detection system of claim 1,
wherein the comparative fuel probe is a first comparative fuel probe that is associated with the first fuel tank of the fuel system,
wherein the capacitive probe assembly is a first capacitive probe assembly,
wherein the float assembly is a first float assembly,
wherein the corrective factor is a first corrective factor based upon the first comparative fuel probe,
wherein the fuel-level detection system further comprises a second comparative fuel probe associated with the second fuel tank of the fuel system that includes a second capacitive probe assembly and a second float assembly,
wherein the comparator is configured to determine a second corrective factor based upon the second comparative fuel probe.

7. The fuel-level detection system of claim 1, wherein the comparator determines the fuel level in the fuel system.

8. The fuel-level detection system of claim 7, wherein the comparator is communicatively coupled with an attitude device such that the determination of the fuel level of the system is based at least in part upon an attitude reading.

9. A comparative fuel probe configured to be added to a fuel system for providing information indicative of a correction factor that can be used to determine a fuel level in the fuel system, the comparative fuel probe comprising:
a capacitive probe assembly including—
a capacitive sensor, and
a probe body,
wherein the capacitive probe assembly is configured to provide information indicative of a comparative capacitive reading; and
a float assembly secured to the capacity probe assembly, including—
a float base,
a float arm having a float attached thereto, and
an orientation sensor for determining an orientation of the float arm relative to the float base,
wherein the float assembly is configured to provide information indicative of a comparative float reading.

10. The comparative fuel probe of claim 9, wherein the orientation sensor is a magneto-resistive sensor.

11. The comparative fuel probe of claim 10, wherein the float base of the float assembly is secured to the capacitive probe at an intermediate location between an upper end and a lower end of the probe body.

12. The comparative fuel probe of claim 11, wherein the capacitive sensor is disposed externally to the first fuel tank and secured to the tank-wall interface.

13. The comparative fuel probe of claim 10,
wherein the probe body is disposed at least partially within a first fuel tank of the fuel system,
wherein the probe body presents a tank-wall interface that is secured to a tank wall of the first fuel tank and extends inward to the fuel tank.

14. A computerized method of determining a fuel level associated with a fuel system, the method comprising the following steps:
acquiring an average comparative capacitive reading from a capacitive probe assembly over time;
acquiring an average comparative float reading from a float assembly over time,
wherein the capacitive probe assembly is located in proximity to the float assembly such that a relationship between the comparative capacitive reading and the comparative float reading is indicative of conditions in the fuel system;
determining a corrective factor based at least in part on a comparison of the average comparative capacitive reading and the average comparative float reading;
receiving a plurality of local capacitive readings from a set of capacitive probes; and
determining a fuel level associated with the fuel system based at least in part upon comparing each local capacitive reading of the plurality of local capacitive readings against the corrective factor.

15. The computerized method of claim 14,
wherein the corrective factor is indicative of a change to the average comparative capacitive reading that would bring alter the average comparative capacitive reading to reflect the average comparative float reading.

16. The computerized method of claim 14, further comprising the following steps:
conditioning a first signal indicative of the comparative capacitive reading;

conditioning a second signal indicative of the comparative float reading;
sending the first signal and the second signal to a comparator.

17. The computerized method of claim 14, further comprising the following steps:
   acquiring an attitude reading from an aircraft attitude device,
   wherein the step of determining the fuel level associated with the fuel system is further based at least in part on the attitude reading from the aircraft attitude device.

18. The computerized method of claim 14, further comprising the following steps:
   acquiring a second comparative capacitive reading from a second capacitive probe assembly;
   acquiring a second comparative float reading from a second float assembly,
   wherein the second capacitive probe assembly is located in proximity to the second float assembly such that a relationship between the comparative capacitive reading and the comparative float reading is indicative of conditions in the fuel system,
   wherein the capacitive probe assembly and the float assembly are associated with a first tank of the fuel system,
   wherein the second capacitive probe assembly and the second float assembly are associated with a second tank of the fuel system;
   determining a second corrective factor based at least in part on a comparison of the second comparative capacitive reading and the second comparative float reading,
   wherein the step of determining the fuel level associated with the fuel system is based at least in part upon comparing each local capacitive reading of the plurality of capacitive readings against the corrective factor.

* * * * *